(12) United States Patent
Kim et al.

(10) Patent No.: US 8,135,220 B2
(45) Date of Patent: Mar. 13, 2012

(54) FACE RECOGNITION SYSTEM AND METHOD BASED ON ADAPTIVE LEARNING

(75) Inventors: Hyun-Soo Kim, Yongin-si (KR); Je-Han Yoon, Seongnam-si (KR); Hyun-Sik Shim, Yongin-si (KR); Young-Hee Park, Seoul (KR); Do-Hyung Kim, Daejeon (KR); Woo-Han Yun, Daejeon (KR)

(73) Assignees: Samsung Electronics Co., Ltd (KR); Electronics and Telecommunications Research Institute (KR)

( * ) Notice: Subject to any disclaimer, the term of this patent is extended or adjusted under 35 U.S.C. 154(b) by 982 days.

(21) Appl. No.: 12/115,250

(22) Filed: May 5, 2008

(65) Prior Publication Data

US 2008/0273766 A1     Nov. 6, 2008

(30) Foreign Application Priority Data

May 3, 2007   (KR) .................. 10-2007-0043108

(51) Int. Cl.
*G06K 9/62* (2006.01)
*G06K 9/00* (2006.01)
(52) U.S. Cl. .................. 382/224; 382/103; 382/118
(58) Field of Classification Search ............. 382/224, 382/103, 118
See application file for complete search history.

(56) References Cited

U.S. PATENT DOCUMENTS

| | | | |
|---|---|---|---|
| 6,647,139 B1* | 11/2003 | Kunii et al. | 382/159 |
| 7,003,135 B2* | 2/2006 | Hsieh et al. | 382/103 |
| 7,315,631 B1* | 1/2008 | Corcoran et al. | 382/118 |
| 7,551,755 B1* | 6/2009 | Steinberg et al. | 382/118 |
| 7,864,990 B2* | 1/2011 | Corcoran et al. | 382/118 |
| 2002/0136433 A1* | 9/2002 | Lin | 382/118 |
| 2003/0059092 A1* | 3/2003 | Okubo et al. | 382/118 |
| 2004/0017930 A1* | 1/2004 | Kim et al. | 382/103 |
| 2005/0058339 A1* | 3/2005 | Kato et al. | 382/159 |
| 2007/0086660 A1* | 4/2007 | Ai et al. | 382/226 |
| 2009/0153457 A1* | 6/2009 | Kato | 345/89 |

FOREIGN PATENT DOCUMENTS

KR   1020040008792   1/2004

(Continued)

OTHER PUBLICATIONS

"Human and Machine Recognition of Faces: A Survey," Rama Chellappa, et al, Proceedings of the IEEE, vol. 83, No. 5, May 1995, pp. 705-740.*

"Beyond Eigenfaces: Probabilistic Matching for Face Recognition," B. Moghaddam, et al, MIT Media Lab. Perceptual Computing Section Technical Report No. 443, 1998, pp. 1-6.*

*Primary Examiner* — Wenpeng Chen
(74) *Attorney, Agent, or Firm* — The Farrell Law Firm, P.C.

(57) ABSTRACT

A face recognition system based on adaptive learning includes a specific person detection and tracking unit for detecting and tracking a specific person from a moving image. A facial feature extraction unit extracts a plurality of facial feature vectors from the detected and tracked specific person. A face recognition unit searches for a given registration model by comparing the extracted facial feature vectors with facial feature vectors of the registration models previously stored in a user registration model database. A learning target selection unit selects a facial feature vector to be added to a record of the given registration model from among the extracted facial feature vectors. A registration model learning unit adds and updates the selected facial feature vector to the record of the given registration model.

18 Claims, 4 Drawing Sheets

| FOREIGN PATENT DOCUMENTS | | |
|---|---|---|
| KR | 1020040037180 | 5/2004 |
| KR | 1020060074410 | 7/2006 |
| KR | 1020070008271 | 1/2007 |
| WO | WO 2006073076 A1 * | 7/2006 |

* cited by examiner

FACE RECOGNITION SYSTEM AND METHOD BASED ON ADAPTIVE LEARNING

PRIORITY

This application claims priority under 35 U.S.C. §119(a) to a Korean Patent Application filed in the Korean Intellectual Property Office on May 3, 2007 and assigned Serial No. 2007-43108, the disclosure of which is incorporated herein by reference.

BACKGROUND OF THE INVENTION

1. Field of the Invention

The present invention relates generally to a face recognition system and method based on adaptive learning, and in particular, to a system and method for recognizing the face of a continuously moving person in an environment of a movable robot.

2. Description of the Related Art

A plurality of face recognition technologies exist and mainly exhibits excellent performance in well-controlled environments, such as a uniform lighting state, a front face, and an expressionless face. However, conventional face recognition technologies have many limitations in a situation in which a robot, or a target person to be recognized by the robot, moves individually and freely.

In order to cope with these limitations, an effort to collect a plurality of images and recognize the face of a person has been made. However, this effort is mainly limited to the selection of a representative pattern using clustering technology, and thus it has not greatly contributed to the improvement of actual face recognition performance. Further, face recognition may not be satisfactorily performed due to a plurality of factors, such as the cases where a target to be recognized is placed under various types of lighting conditions, where the attitude or facial expression of a target varies, or where the face of a target varies with a lapse of time.

SUMMARY OF THE INVENTION

An aspect of the present invention is to substantially solve at least the above problems and/or disadvantages and to provide at least the advantages described below. Accordingly, an aspect of the present invention is to provide a face recognition system and method based on adaptive learning, which can recognize various facial shapes by gradually learning the face of a specific person.

Another aspect of the present invention is to provide a face recognition system and method based on adaptive learning, which can recognize the face of a specific person in an environment of a movable robot.

A further aspect of the present invention is to provide a face recognition system and method, which can gradually learn the face of a person, varying with lighting, attitude, facial expression and lapse of time, thus increasing a recognition rate.

According to one aspect of the present invention, a face recognition system based on adaptive learning is provided. The face recognition system includes a specific person detection and tracking unit for detecting and tracking a specific person from a moving image, a facial feature extraction unit for extracting a plurality of facial feature vectors from the detected and tracked specific person, a face recognition unit for searching for a given registration model by comparing the extracted facial feature vectors with facial feature vectors of the registration models previously stored in a user registration model database, a learning target selection unit for selecting a facial feature vector to be added to a record of the given registration model from among the extracted facial feature vectors, and a registration model learning unit for adding and updating the selected facial feature vector to the record of the given registration model.

According to another aspect of the present invention, a face recognition method based on adaptive learning is provided. The face recognition method includes detecting and tracking a specific person from a moving image, extracting a plurality of facial feature vectors from the detected and tracked specific person, searching for a given registration model by comparing the extracted facial feature vectors with facial feature vectors of the registration models previously stored in a user registration model database, selecting a facial feature vector to be added to a record of the given registration model from among the extracted facial feature vectors, and adding and updating the selected facial feature vector to the record of the given registration model.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
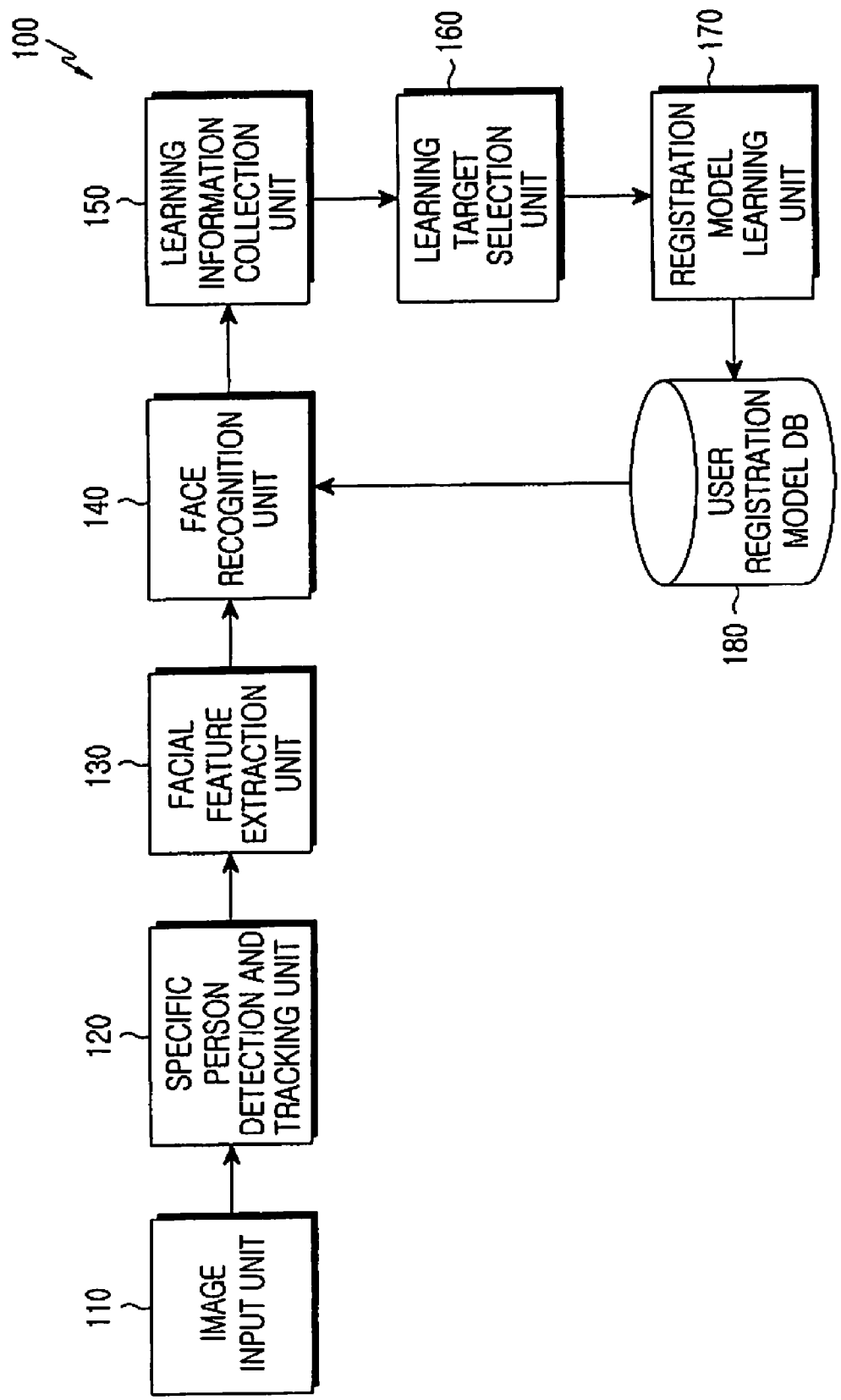
FIG. 1 is a diagram showing the construction of a face recognition system based on adaptive learning according to an embodiment of the present invention.

Preferred embodiments of the present invention will now be described in detail with reference to the accompanying drawings. In the drawings, the same or similar elements are denoted by the same reference numerals even though they are depicted in different drawings. In the following description, a detailed description of known functions and configurations incorporated herein has been omitted for clarity and conciseness.

FIG. 1 is a diagram showing the construction of a face recognition system based on adaptive learning according to an embodiment of the present invention. In FIG. 1, the construction of a face recognition system 100 based on adaptive learning and the connection of respective components thereof are shown. Referring to FIG. 1, the face recognition system 100 based on adaptive learning (hereinafter a 'face recognition system') includes an image input unit 110, a specific person detection and tracking unit 120, a facial feature extraction unit 130, a face recognition unit 140, a learning information collection unit 150, a learning target selection unit 160, a registration model learning unit 170, and a user registration model database (DB) 180. Respective components are described in detail below.

The image input unit 110, which is a device for receiving a moving image, can be a component for receiving a moving image file created by a camcorder or the like, or a component for directly receiving continuous image streams from a Closed Circuit Television (CCTV), a Universal Serial Bus (USB) camera, etc. The image input unit 110 can be implemented using a CCTV for recognizing a person in a security device. Further, a movable robot can personally take the image of an object using a camcorder and can provide a moving image. The present invention is useful for the environment of a movable robot, which enables the recognition of a user. The image input unit 110 transmits the moving image to the specific person detection and tracking unit 120.

The specific person detection and tracking unit 120 detects the face of a specific person from the received moving image, and continues to track the face of the specific person when the person moves. When a plurality of people are present in the moving image, a person closest to the camcorder, that is, a person having the largest facial image, which is exposed to the moving image, can be selected, and all persons exposed to the moving image can be simultaneously detected if necessary.

When the specific person moves in the moving image, the area of the face of the moving person is continuously detected and tracked. In this case, whether the moving person is correctly detected and tracked or whether detected and tracked persons are the same person or different persons, must be verified. Methods of verifying whether detected and tracked persons are the same person may include different methods. First, a method of recognizing the color of clothes of a specific person from a moving image, and detecting and tracking the color of the clothes, or detecting and tracking the motion of a specific person on the basis of a degree of the variation in the motion of the person can be used. Further, a method using information about whether the areas of the face of a specific person overlap each other between consecutive frames can be used and that is described below. When facial areas move in consecutive frames of a moving image, there is a high probability that a facial area having the widest overlap region is the facial area of the same person, and thus this method is implemented to detect a facial area having the highest overlap degree between consecutive frames as the face of the same person. Further, when all persons exposed to the moving image are intended to be simultaneously detected and tracked, the facial areas of all of the persons can be simultaneously detected and tracked. The facial area image detected by the specific person detection and tracking unit is transmitted to the facial feature extraction unit 130.

The facial feature extraction unit 130 performs preprocessing on the facial image of the specific person who has been detected and tracked by the specific person detection and tracking unit 120 and extracts features from the preprocessed facial image, thus configuring the features in the form of vectors. These facial feature vectors can be configured for respective frames of the moving image. A number of facial feature vectors corresponding to the number of frames to which the facial image is exposed are generated. Feature extraction techniques, such as Principal Component Analysis (PCA), Elastic Bunch Graph Matching (EBGM), or Linear Discrimination Analysis (LDA), can be used as the methods of extracting facial features. The facial feature extraction unit 130 transmits a plurality of facial feature vectors for a specific person to the face recognition unit 140.

The face recognition unit 140 recognizes a specific user having the facial features indicated by the received facial feature vectors. For this operation, the face recognition unit 140 compares the extracted facial feature vectors with the facial feature vectors of the registration models previously stored in the user registration model database (DB) 180, searches the user registration model DB 180 for a registration model having a facial feature vector most similar to the extracted facial feature vectors, and recognizes the found registration model. The face recognition unit 140 calculates similarities between the extracted facial feature vectors and the previously stored facial feature vectors through this comparison. The face recognition unit 140 searches the user registration model DB for a registration model having a facial feature vector, having the highest similarity to the extracted facial feature vectors, when the similarity is equal to or greater than a threshold. In the user registration model DB 180, registration models must be previously stored for respective users. Therefore, a procedure for registering the face of each user in the user registration model DB 180 must be performed at least once in advance. Methods of recognizing a face having a facial feature vector, which is most similar to the facial feature vectors of the registration models, can be implemented using an artificial neural network-based method and a template matching-based method.

Each registration model can be constructed to include a plurality of sub-models. These sub-models are formed by separately grouping feature members having relatively high similarity, among respective feature members registered in the registration model. Even in the case of a single registration model, a front face, a smile face, a future face, etc. may have very different facial features among them. Thus, a plurality of sub-models must be separately created. The face recognition unit 140 transmits ① the extracted facial feature vectors, ② the identification (ID) of a registration model calculated as a model having the highest similarity to the extracted facial feature vectors, and ③ the highest similarity calculated in this procedure to the learning information collection unit 150.

The learning information collection unit 150 is implemented using a queue having a predetermined number of nodes. In each node, the facial feature vectors, the ID of the registration model, and the similarity to the registration model, which have been received from the face recognition unit 140, are stored. When the specific person detection and tracking unit 120 fails in detection or tracking, all of the facial feature vectors stored in the queue are deleted, and facial feature vectors, which are newly detected and tracked, are collected and stored in the queue. When the queue is full, the learning target selection unit 160 is activated.

The learning target selection unit 160 initially selects a registration model to be learned from among the registration models stored in the learning information collection unit 150, and subsequently selects facial feature vectors to be added and updated to a given registration model record. The term 'registration model to be learned' means the registration model of a specific person who is finally recognized using the IDs of the registration models, which have been collected and stored in the queue up to the present. The ID of a registration model, occupying a maximum number of nodes in the queue, is the ID of the registration model to be learned. Thereafter, a facial feature vector, which will be a learning target, is selected from among the facial feature vectors stored in the respective nodes of the queue. The term 'learning target facial feature vector' means the feature vector of a facial shape, such as the shape of a crying or laughing face, side face or future face of the user, which is different from previously registered facial feature vectors, or from the feature vector of a special facial shape. Therefore, among the facial feature vectors stored in the queue, a facial feature vector having the lowest similarity or recognized as another ID when the stored facial feature vectors are compared to the facial feature vectors previously registered in the given registration model of the user registration model DB 180 is most suitable for a learning target. The learning target selection unit 160 transmits the selected learning target to the registration model learning unit 170.

The registration model learning unit 170 adds and updates the facial feature vector selected as the learning target to the given registration model of the user registration model DB 180. When it is determined that the learning target is similar to the feature members included in any sub-model of the registration model, the facial feature vector is added to the given sub-model. When it is determined that the learning target is not similar to the facial feature vectors included in any sub-model, a new sub-model is created and the learning target is added to the new sub-model. Since a new facial image is gradually updated to the registration model, the face recognition unit for recognizing the user with reference to the registration model DB 180 can more reliably recognize the user with a lapse of time. To determine whether facial feature vectors are similar, as described above, a method of calculating similarity can be performed using methods, such as well-known cross-correlation or geometric distance calculation.

Hereinafter, a face recognition method based on adaptive learning is described in detail with reference to FIGS. 2, 3, and 4.

Figure 2:
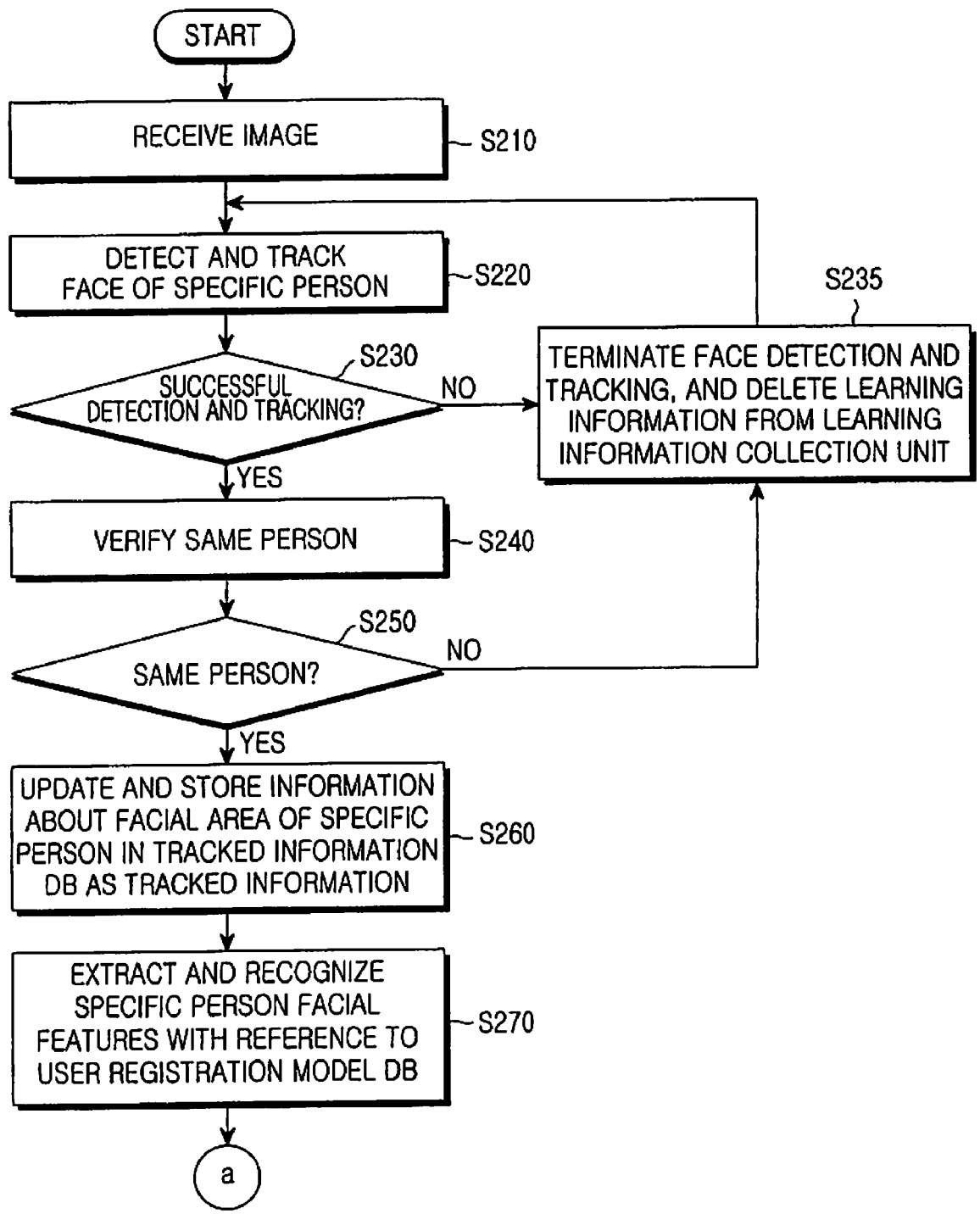
FIG. 2 is a flowchart showing the specific person detection and tracking and specific person recognition of a face recognition method based on adaptive learning according to an embodiment of the present invention.

FIG. 2 is a flowchart showing the detection and tracking of a specific person and the recognition of a specific person in the face recognition method based on adaptive learning according to an embodiment of the present invention. Referring to FIG. 2, when the image input unit 110 receives a moving image in step S210, the specific person detection and tracking unit 120 detects and tracks the face of a specific person from the moving image in step S220. Since the facial area of the specific person will have a higher overlap degree between consecutive frames, it is detected and tracked as the facial area of the specific person. The face of the specific person can be detected and tracked using the color of clothes of the specific person, or the degree of variation in the motion of the specific person. Thereafter, the specific person detection and tracking unit 120 determines in step S230 whether the detection and tracking of the face of the specific person has been successfully performed for each frame of the moving image. When it is determined in step S230 that face detection has been successfully performed, the specific person detection and tracking unit 120 verifies in step S240 whether the currently detected face is the face of the same person that has been previously detected. When it is determined in step S240 that the currently detected face is the face of the same person, the specific person detection and tracking unit 120 updates and stores information about the facial area of the specific person, which has been detected and tracked, in a tracked information DB in step S260. When the specific person disappears from the moving image, when face detection or tracking has failed due to an appearance of another person in the facial area of the specific person, or when it is determined that the currently detected face is not the face of the same person upon the verification of the face of the same person, the specific person detection and tracking unit 120 terminates current face detection and tracking and attempts new face detection and tracking after designating a new specific person in step S235.

The facial feature extraction unit 130 extracts facial features using the information about the facial area of the specific person stored in the tracked information DB in the above procedure and creates facial feature vectors. The facial feature vectors can be created for respective pieces of information of the facial areas of respective frames. In step S270, the face recognition unit 140 searches for a given registration model by comparing the created facial feature vectors with the facial feature vectors of respective user registration models, which have been previously registered in the user registration model DB.

Figure 3:
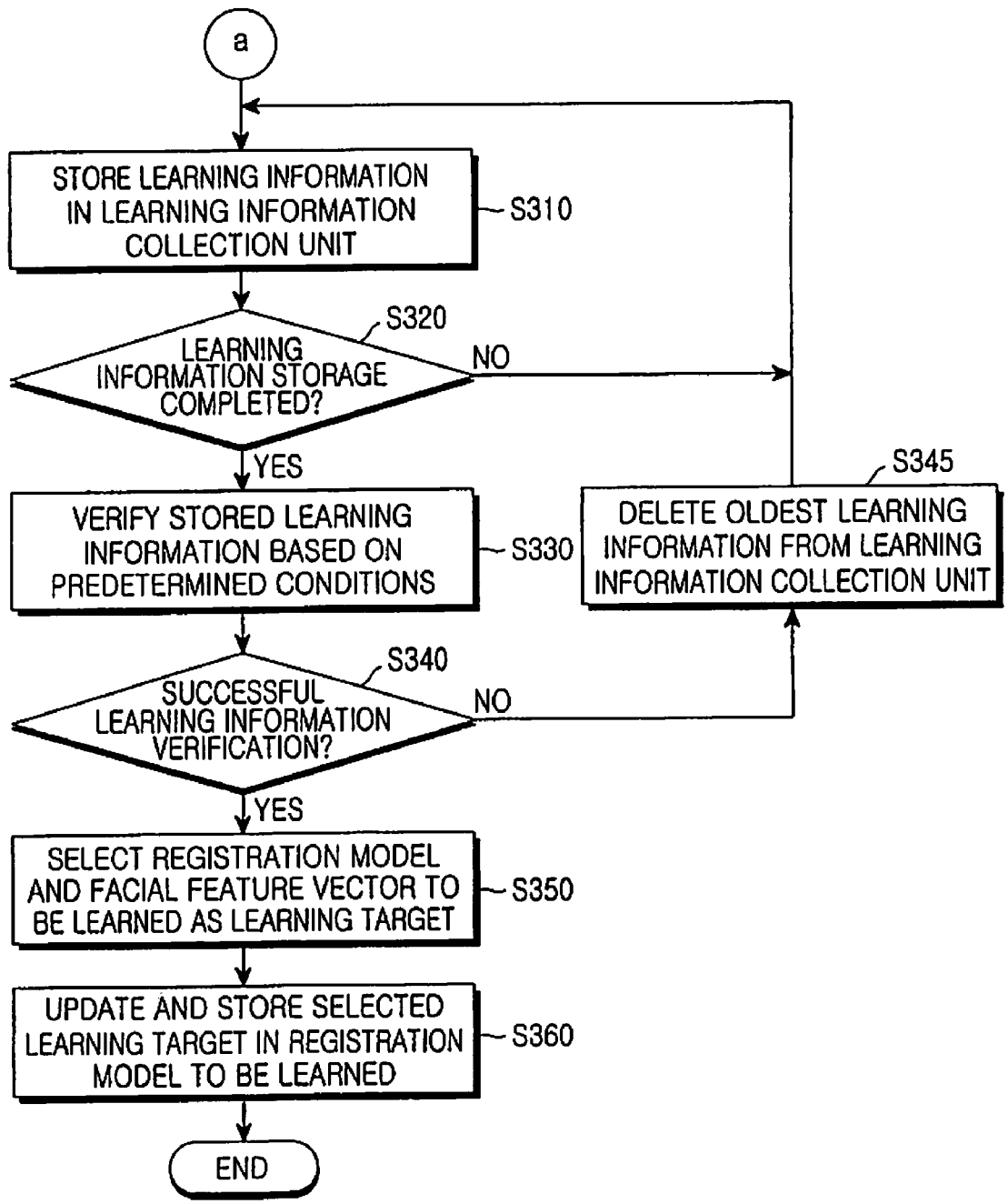
FIG. 3 is a flowchart showing the learning information collection, learning target selection, and registration model learning of the face recognition method based on adaptive learning according to an embodiment of the present invention.
Figure 4:
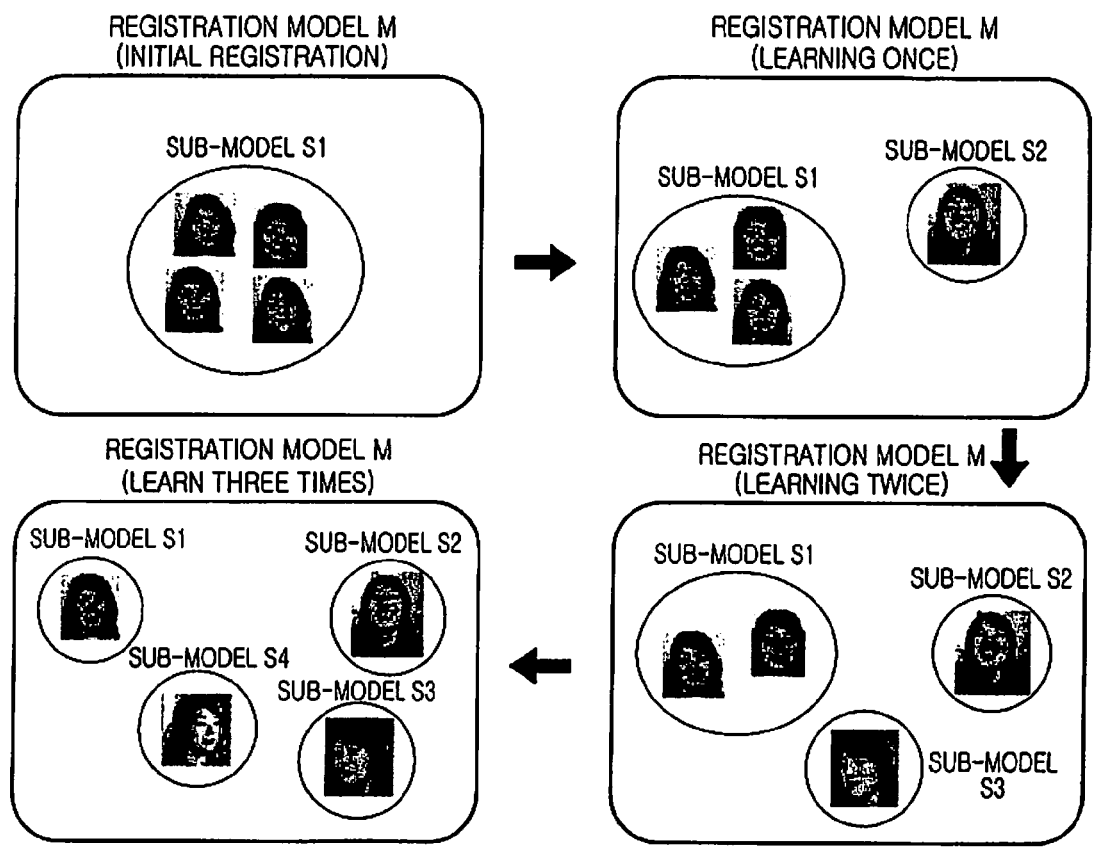
FIG. 4 is a diagram showing a registration model learning of the face recognition method based on adaptive learning according to an embodiment of the present invention.

The flowchart of FIG. 2 continues to the flowchart of FIG. 3, and the flowchart of FIG. 3 illustrates the learning information collection, learning target selection, and registration model learning of the face recognition method based on an adaptive learning according to an embodiment of the present invention. In step S310 the learning information collection unit 150 collects and stores ① the facial feature vectors of the specific person extracted by the facial feature extraction unit 130, ② the ID of the given registration model found by the face recognition unit 140, and ③ the similarities between the facial feature vectors of the specific person and the facial feature vector of the given registration model. This learning information is used as information required for the learning target selection unit 160 for selecting a learning target. The learning information collection unit 150 is implemented using a queue having a certain number of nodes. Whenever the specific person detection and tracking unit 120 detects and tracks a face, learning information is stored in each node of the queue. In each node, learning information including the previously mentioned elements ① the facial feature vectors of the specific person extracted by the facial feature extraction unit 130, ② the ID of the given registration model found by the face recognition unit 140, and ③ the similarities between the facial feature vectors of the specific person and the facial feature vector of the given registration model is stored.

When the collection and storage of learning information in all of the nodes of the queue has been completed in step S320, the learning target selection unit 160 verifies whether the collected learning information has qualification as learning information on the basis of predetermined conditions in step S330. These conditions can be set as follows.

Condition 1

① The ratio of the number of nodes, in which recognized registration model IDs are the same, to the total number of nodes must be equal to or greater than a primary verification ratio threshold, and ② the maximum value of the similarities of the nodes satisfying the sub-condition ① under the Condition 1 must be equal to or greater than a primary verification similarity threshold.

Condition 2

① The ratio of the number of nodes, in which recognized registration model IDs are the same, to the total number of nodes must be 1.0, and ② the maximum value of the similarities of the nodes satisfying the sub-condition ① under the Condition 2 must be greater than or equal to a secondary verification similarity threshold.

For example, in the condition 1, when IDs and similarities stored in the queue are A(0.4), A(0.5), A(0.7), A(0.2), and B(0.4), the stored learning information is determined to have qualification as learning information when the primary verification ratio threshold is 0.8, and the primary verification similarity threshold is 0.6. In the condition 2, when IDs and similarities stored in the queue are A(0.2), A(0.1), A(0.2), A(0.3), and A(0.4), the stored learning information is determined to have qualification as learning information when the secondary verification similarity threshold is equal to or greater than 0.3 in step S340.

When the conditions 1 and 2 are not satisfied and the verification procedure has failed, the learning target selection unit 160 determines that the learning information stored in the queue is not suitable, deletes the learning information from the node on which the learning information has been first stored, and waits for the storage of new learning information to attempt verification in step S345.

When the learning information satisfies either of the two conditions and verification has been successfully performed, the learning target selection unit 160 finally selects a registration model to be learned and a facial feature vector to be learned from the learning information as a learning target in step S350. A facial feature vector having the features most different from that of the found registration model is selected as the learning target. A facial feature vector having the features most different from that of the previously registered registration model is a good learning target. In the above Condition 1, a registration model having an ID, for which the node ratio is greater than or equal to the primary verification ratio threshold, among the registration models of respective nodes, is the registration model to be learned. The facial feature vector of a node having an ID other than the ID of the given registration model is the facial feature vector to be learned. In Condition 2, since the registration models of respective nodes have the same ID, the registration model and a facial feature vector having the lowest similarity among the facial feature vectors of respective nodes are selected as the learning target.

The registration model learning unit 170 performs learning using the selected learning target in step S360. This learning is important that a new facial feature vector is additionally updated to the registration model and thus the recognition rate of the face recognition unit 140 is increased. Therefore, the registration model is learned by adding and updating the selected facial feature vector to the selected registration model. Each registration model may include a plurality of sub-models. Each sub-model can be formed by grouping relatively similar facial feature vectors among the facial feature vectors registered in the same registration model and can be implemented so that corresponding facial feature vectors belong to the same sub-model when similarity between facial feature vectors is calculated and is greater than or equal to a predetermined sub-model threshold. The registration model learning unit 170 adds and updates the learning target to the sub-model when the similarity between the selected facial feature vector and the facial feature vector of a predetermined sub-model is greater than or equal to a sub-model threshold (e.g. 0.3) whereas, the registration model learning unit 170 creates a new sub-model and adds the learning target to the new sub-model when the similarity is less than the sub-model threshold. FIG. 4 is a diagram showing a registration model learning of the face recognition method based on adaptive learning.

Various facial shapes that were acquired when the face of a user is recognized are collected to update user registration models and thus the face of the user can be reliably recognized regardless of different types of environmental variation.

Further, even in an environment in which a robot for recognizing a user and the user are moving separately, various facial shapes of the user are learned, and the face of the user can be reliably recognized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A face recognition system based on adaptive learning, comprising:
a specific person detection and tracking unit for detecting and tracking a specific person from a moving image;
a facial feature extraction unit for extracting a plurality of facial feature vectors from the detected and tracked specific person;
a face recognition unit for searching for a given registration model by comparing the extracted facial feature vectors with facial feature vectors of the registration models previously stored in a user registration model Database (DB);
a learning target selection unit for selecting a facial feature vector to be added to a record of the given registration model from among the extracted facial feature vectors, wherein the selected facial feature vector has a lowest similarity, of the extracted facial feature vectors, to the given registration model; and
a registration model learning unit for adding and updating the selected facial feature vector to the record of the given registration model.

2. The face recognition system of claim 1, wherein the face recognition system is applied to a movable robot.

3. The face recognition system of claim 2, further comprising an image input unit for capturing the moving image and transmitting the moving image to the specific person detection and tracking unit.

4. The face recognition system of claim 1, wherein the specific person detection and tracking unit detects and tracks the specific person on a basis of a degree in which facial areas of the specific person overlap each other in the moving image with a lapse of time.

5. The face recognition system of claim 1, wherein the face recognition unit calculates similarities between the extracted facial feature vectors and facial feature vectors of the registration models stored in the user registration model DB, to recognize the given registration model.

6. The face recognition system of claim 5, further comprising a learning information collection unit for storing an identification (ID) of the given registration model, the extracted facial feature vectors, and the similarities when the registration model found through the search by the face recognition unit is present.

7. The face recognition system of claim 6, wherein the learning information collection unit stores the ID of the given registration model, the extracted facial feature vectors, and the similarities in each node of a queue having a predetermined number of nodes.

8. The face recognition system of claim 7, wherein the learning target selection unit selects the given registration model as a registration model to be learned, and selects a facial feature vector of a node having the lowest similarity to the given registration model among nodes in which the learning information is stored, as a facial feature vector to be learned.

9. The face recognition system of claim 1, wherein each of the registration models previously stored in the user registration model DB comprises a plurality of sub-models, facial feature vectors of which have similarities therebetween that are greater than or equal to a threshold.

10. The face recognition system of claim 9, wherein the registration model learning unit adds the selected facial feature vector to a record of a specific sub-model when similarity between the selected facial feature vector and the facial feature vector of the sub-model is greater than or equal to the threshold, and creates a new sub-model and adds the selected facial feature vector to a record of the new sub-model when the similarity is less than the threshold.

11. A face recognition method based on adaptive learning, comprising:
- detecting and tracking a specific person from a moving image;
- extracting a plurality of facial feature vectors from the detected and tracked specific person;
- searching for a given registration model by comparing the extracted facial feature vectors with facial feature vectors of the registration models previously stored in a user registration model Database (DB);
- selecting a facial feature vector to be added to a record of the given registration model from among the extracted facial feature vectors, wherein the selected facial feature vector has a lowest similarity, of the extracted facial feature vectors, to the given registration model; and
- adding and updating the selected facial feature vector to the record of the given registration model.

12. The face recognition method of claim 11, wherein, in the detecting and tracking, the specific person is detected and tracked on a basis of a degree in which facial areas of the specific person overlap each other in the moving image with a lapse of time.

13. The face recognition method of claim 11, wherein, in the searching for the given registration model, the registration model is recognized by calculating similarities between the extracted facial feature vectors and facial feature vectors of the registration models stored in the user registration model DB.

14. The face recognition method of claim 13, further comprising, after the searching for the given registration model and before the selecting the facial feature vector, storing an Identification (ID) of the given registration model, the extracted facial feature vectors, and the similarities when the given registration model found through the search is present.

15. The face recognition method of claim 14, wherein, in the storing step, the ID of the given registration model, the extracted facial feature vectors, and the similarities are stored in each node of a queue having a predetermined number of nodes.

16. The face recognition method of claim 15, wherein, in the selecting the facial feature vector, the given registration model is selected as a registration model to be learned and a facial feature vector of a node having the lowest similarity to the given registration model among nodes in which the learning information is stored is selected as a facial feature vector to be learned.

17. The face recognition method of claim 11, wherein each of the registration models previously stored in the user registration model DB comprises a plurality of sub-models, facial feature vectors of which have similarities therebetween that are greater than or equal to a threshold.

18. The face recognition method of claim 17, wherein, in the adding and updating the selected facial feature vector, the selected facial feature vector is added to a record of a specific sub-model when similarity between the selected facial feature vector and the facial feature vector of the sub-model is equal to or greater than the threshold, and a new sub-model is created and the selected facial feature vector is added to a record of the new sub-model when the similarity is less than the threshold.

* * * * *